US008822017B2

(12) United States Patent
Mihai et al.

(10) Patent No.: US 8,822,017 B2
(45) Date of Patent: Sep. 2, 2014

(54) METHOD FOR PAPER TREATMENT

(75) Inventors: Nicoleta Mihai, Oakville (CA); Samantha M. Roland, Oakville (CA); Guiqin Song, Milton (CA); Gordon Sisler, St. Catharines (CA); T. Brian McAneney, Burlington (CA)

(73) Assignee: Xerox Corporation, Norwalk, CT (US)

( * ) Notice: Subject to any disclaimer, the term of this patent is extended or adjusted under 35 U.S.C. 154(b) by 511 days.

(21) Appl. No.: 12/364,953

(22) Filed: Feb. 3, 2009

(65) Prior Publication Data

US 2010/0196682 A1 Aug. 5, 2010

(51) Int. Cl.
*B32B 5/00* (2006.01)
*G03G 13/06* (2006.01)
*G03G 15/00* (2006.01)

(52) U.S. Cl.
CPC .. *G03G 15/6582* (2013.01); *G03G 2215/00708* (2013.01); *G03G 2215/00426* (2013.01)
USPC ......... 428/212; 428/220; 430/102; 430/126.1

(58) Field of Classification Search
USPC .......................................... 428/212; 430/102
See application file for complete search history.

(56) References Cited

U.S. PATENT DOCUMENTS 4,029,827 A 6/1977 Imperial et al.
4,101,686 A 7/1978 Strella et al.
4,188,140 A 2/1980 Clemens et al.
5,157,445 A 10/1992 Shoji et al.
5,441,838 A * 8/1995 Pane ............................... 430/97
5,593,879 A * 1/1997 Steller et al. .................. 435/325
5,835,831 A 11/1998 Staudenmayer et al.
2002/0129833 A1* 9/2002 Drzal et al. ....................... 134/1
2006/0290760 A1* 12/2006 German et al. ............... 347/102
2007/0021522 A1* 1/2007 Halfyard et al. ................ 522/18
2007/0148414 A1 6/2007 Halfyard et al.
2008/0014513 A1 1/2008 Sisler et al.
2008/0057433 A1 3/2008 Anderson
2008/0071043 A1 3/2008 Ram
2008/0171199 A1 7/2008 Song
2008/0171826 A1 7/2008 Song
2008/0248196 A1 10/2008 Anderson
2008/0274420 A1 11/2008 Song

FOREIGN PATENT DOCUMENTS

JP 07-152037 A 6/1995
JP 10333478 A 12/1998
JP 2007062027 A 3/2007

OTHER PUBLICATIONS

U.S. Appl. No. 11/850,138, filed Sep. 5, 2007, "Method, Apparatus and System for Preparing Adhesive-Promoter-Treated Hot Melt Adhesives in Continuous Mode," Lee, 39 pages.
U.S. Appl. No. 11/877,319, filed Oct. 23, 2007, "Methods for Applying Fluorescent Ultraviolet Curable Varnishes," VanBeisien, 27 pages.

(Continued)

*Primary Examiner* — Aaron Austin
*Assistant Examiner* — Tahseen N Khan
(74) *Attorney, Agent, or Firm* — Pillsbury Winthrop Shaw Pittman LLP

(57) ABSTRACT

A surface treatment method of oil contaminated xerographic prints which increases the surface energy of the print to levels close to the values corresponding to the original uncontaminated paper. Subjecting the contaminated surface to both ultraviolet (UV) radiation and ozone can change the chemical structure of the surface of the paper in such a way that a highly polar surface is created as a consequence of this treatment, leading to enhanced adhesion properties of the xerographic print.

9 Claims, 4 Drawing Sheets

(56) References Cited

OTHER PUBLICATIONS

U.S. Appl. No. 12/016,524, filed Jan. 18, 2008, "Use of Silane Promoter to Modify Pressure Sensitive Adhesive for Use in Pressure Seal Mailers Printed on Igen3," Sister, 29 pages.

U.S. Appl. No. 12/263,258, filed Oct. 31, 2008, "Laminating Film and Methods of Use Thereof," Song, 24 pages.

EP Search Report dated Aug. 3, 2011 for EP Application No. 11157273.1, 5 pages.

* cited by examiner

METHOD FOR PAPER TREATMENT

BACKGROUND

The present disclosure generally relates to a paper treatment method that improves the wetting and adhesion properties of materials to an oil contaminated print. By subjecting the contaminated surface to the combined action of ultraviolet (UV) radiation and ozone, the UV radiation and ozone exposure can change the surface chemistry of the contaminated print allowing for favourable material—paper interactions leading to improved adhesion.

In conventional xerography, electrostatic latent images are formed on a xerographic surface by uniformly charging a charge retentive surface, such as a photoreceptor. The charged area is then selectively dissipated in a pattern of activating radiation corresponding to the original image. The latent charge pattern remaining on the surface corresponds to the area not exposed by radiation. Next, the latent charge pattern is visualized by passing the photoreceptor by one or more developer housings comprising thermoplastic toner, which adheres to the charge pattern by electrostatic attraction. The developed image is then fixed to the imaging surface or is transferred to a receiving substrate, such as paper, to which it is fixed by a suitable fusing technique involving the application of heat, resulting in a xerographic print or toner-based print.

To ensure and maintain good release properties of the fuser roll, it has become customary to apply release agents to the fuser roll during the fusing process. These materials are applied as thin films of low surface energy liquids, for example, nonfunctional silicone oils or mercapto- or amino-functional silicone oils, to prevent toner offset.

U.S. Pat. No. 4,029,827 discloses the use of polyorganosiloxanes having mercapto functionality as release agents. U.S. Pat. No. 4,101,686 and U.S. Pat. No. 4,185,140 disclose polymeric release agents having functional groups such as carboxy, hydroxy, epoxy, amino, isocyanate, thioether, or mercapto groups. U.S. Pat. No. 5,157,445 discloses toner release oil having a functional organopolysiloxane.

The mechanism involved in the use of thin liquid films of fuser oils in two roll fuser systems to ensure release between the fuser roll surface and the thermoplastic toner is a dynamic cohesive failure or film splitting of the release oil in the diverging roll nip exit, leaving a barrier of fuser oil on both roll and the toner image surfaces. The residual film of release oil on the fused toner image and paper, which is referred to in this document as contaminating oil or oil contamination can cause problems with subsequent, end-use applications involving wetting or adhesion. After printing, images may experience a number of process treatments involving wetting and adhesion, including coating (as in overprint varnish application), lamination, application of adhesives (book-binding, post-it notes), thermal transfer printing (cheque post-encoding or bar code printing for example). Residual fuser oil present on the print image surface, typically as a discontinuous film, results in a complex surface energy gradient varying between low surface energy oil regions and relatively high surface energy toner and paper regions. Attempts to wet and adhere materials across this gradient results in numerous well-known surface tension related coating defects including pinholes, craters and reticulation for coating liquids and subsequent dried films; failure to achieve fiber tear when adhesive is applied to produce a joint as in the case of bookbinding or lamination; missing information in the case of thermal transfer printing. It has been shown that certain functionalized silicone fuser oils exhibit these problems to a greater extent than other release oils.

A number of patents have proposed solutions to these end-use application problems, such as U.S. patent Ser. Nos. 11/468,620; 11/623,509; 11/623,640; 11/850,138; 11/696,954; 11/743,447; 11/877,319; 12/016,524; 12/263,258; and 11/532,704, all of which are hereby incorporated by reference in their entireties. These references involve a modification of the adhesive or coating material to improve wetting and adhesion over oil contaminated prints or the inclusion of an additional coating to act as a coupling or tie-coat layer; consequently, these solutions are application specific. By contrast, the invention proposed here acts directly on the oil contaminated print surface to increase surface energy, resulting in significantly improved wetting adhesion potentially for all end-use applications which is seen as an advantage among available solutions.

SUMMARY

According to embodiments illustrated herein, there is provided a method for improving wetting and adhesion of materials to oil contaminated prints.

According to one embodiment, there is provided a method for treating xerographic printed paper, comprising providing a source of ultraviolet radiation where the UV radiation comprises at least a first wavelength and a second wavelength, applying the ultraviolet radiation to a xerographic printed paper contaminated with fuser oil as a result of the fusing process, and treating the xerographic printed paper with the ultraviolet radiation and ozone, wherein the surface energy of the contaminated print is substantially increased and the treated xerographic print subsequently exhibits excellent adhesion as a result of the UV/ozone surface treatment.

According to another embodiment, there is provided a method for treating xerographic printed paper, comprising providing a source of ultraviolet radiation where the UV radiation comprises at least a first wavelength and a second wavelength, applying the ultraviolet radiation to a xerographic printed paper contaminated with fuser oil as a result of the fusing process, and treating the xerographic printed paper with the ultraviolet radiation and ozone, wherein the surface energy of the contaminated print is substantially increased from about 13 mN/m to about 40 mN/m as calculated from the contact angle values of water and diiodomethane as a consequence of the UV/ozone surface treatment.

A xerographic print comprising a paper substrate, and a fused toner image on the paper substrate containing residual fuser oil contamination, wherein the xerographic print has been surface treated with ultraviolet radiation comprising at least a first wavelength and a second wavelength and further wherein the surface energy of the xerographic print after printing measures approximately the same value as the surface energy on the paper substrate prior to printing of the toner image such that the xerographic print displays excellent adhesion.

BRIEF DESCRIPTION OF THE DRAWINGS

For a better understanding, reference may be had to the accompanying figure.

Unless otherwise noted, the same reference numeral in different Figures refers to the same or similar feature.

DETAILED DESCRIPTION

Figure 1:
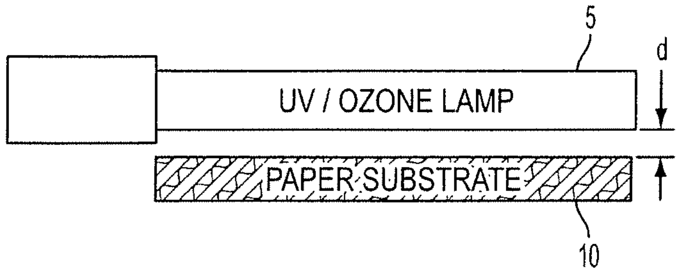
FIG. 1 represents a block diagram showing application of the method for removing release agent contamination from a print surface in accordance with the present embodiments.

As explained above, release agents are applied to the fuser roll to provide the release of a substrate containing an image thereon from the fuser roll after the toner image has been formed on the substrate. Thus, xerographic prints may be contaminated by a release agent such as poly(dimethylsiloxane) fuser oil due to the printing process. Some release agent may remain on a toner image that may cover any portion of the print and on the substrate itself. In other words, some release agent may remain on a final substrate having an image thereon and may at least partially cover a substrate having no toner image or a substrate having a toner image thereon. "Partially" refers to the release agent covering from above 0 percent to less than 100 percent of the substrate, such as from about 10 percent to about 90 percent or from about 20 percent to about 80 percent of the substrate. The release agent may chemically bond to the surface of the prints because of the reactive functional group such as amino- or mercapto-functional group in fuser oil during fusing process at high pressure and high temperature. The surface free energy (SFE) of the prints may thus dramatically drop from a range of higher than about 30 mN/m for substrates such as paper to a range of from about 8 mN/m to less than about 30 mN/m. Generally, commercially available hot melt adhesives bind to substrates having a SFE higher than about 30 mN/m. Thus, the oil contamination on the print has a negative impact on a variety of applications such as bookbinding, laminating, thermal transfer printing of bar codes, check post encoding and pressure sealed mailers.

Any release agent remaining on the substrate, with or without a toner image thereon, may be detrimental to an adhesive attempting to adhere to the substrate having a toner image. This is particularly important when the substrate is to be laminated or coated with a hot melt adhesive, such as an adhesive used in bookbinding. This release agent may also prevent materials utilizing adhesives, for example, POST-IT® notes, from adhering to the substrate.

Release agents used in releasing a substrate from a fuser roll in an imaging device include poly-ogranofunctional siloxanes, such as amino-functional silicone oils, such as methyl aminopropyl methyl siloxane, ethyl aminopropyl methyl siloxane, benzyl aminopropyl methyl siloxane, dodecyl aminopropyl methyl siloxane, aminopropyl methyl siloxane, and the like. In particular, the application of polydimethylsiloxane (PDMS) oil used commonly for release in xerographic fusing reduces the surface energy of the printed substrate. The effect is particularly strong in the case of amino-functionalized PDMS oil due to the hydrogen bonding at the paper/oil interface restricting diffusion of the oil below the paper surface. As a result of the reduced surface energy, many applications that involve adhesion to the print are adversely impacted. The present embodiments demonstrate the ability to increase the surface energy of oil contaminated xerographic prints through combined UV radiation and ozone treatment.

By using the combined action of UV radiation and ozone to treat non-image areas of the oil contaminated print, it is shown that that the surface energy of the print can be almost restored to values close to the surface energy of the original uncontaminated paper.

The present embodiments involve the application of ultraviolet (UV) radiation of two specific wavelengths to the paper to be treated. In embodiments, the UV radiation is produced by a low pressure mercury lamp. While not being limited to any specific theory, the UV radiation changes the surface chemistry of the contaminated print, as indicated by the presence of polar carbonyl groups created on the surface of the paper as a consequence of this treatment.

The action of the UV radiation is enhanced by the presence of ozone. The ozone can be produced as a by-product of the same UV lamp that emits two specific wavelengths. The first wavelength irradiates the paper surface which breaks contaminant molecules in the surface of the contaminated paper. Meanwhile, the second wavelength is absorbed by atmospheric oxygen which then dissociates into atomic oxygen and recombines to form ozone. By irradiating the oil contaminated printed paper with UV light of appropriate wavelength, the combined action of the UV radiation and ozone leads to the formation of polar groups on the surface of the paper. In most embodiments, the treatment time is no more than 25 minutes, or from about 5 minutes to about 25 minutes, thus providing an efficient manner to treat the printed paper before completing with a finishing adhesive, although the time period can be outside of these ranges. Treatment time can be as low as 1 second or less, provided that a high output lamp is being used. Tests have shown that the UV/ozone treated paper exhibits very good glue to paper adhesion.

One embodiment is a method comprising forming a toner-based image on a substrate, coated or uncoated paper for example, in a process that employs a fuser that uses fuser oil, the imaged substrate having low surface energy regions resulting from contact with fuser oil; at any time following fusing the print is exposed to UV radiation comprising two distinct wavelengths from the class designated UVC, so that the surface of the substrate, image and non-image areas, are exposed to both UV radiation energy and ozone. The first wavelength $\lambda_1$ is preferably 254 nm but within the range 210-315 nm and is absorbed by atmospheric oxygen leading to the formation of ozone. The second wavelength $\lambda_2$ is preferably 185 nm but within the range 100-210 nm and is absorbed by most organic contaminants breaking them into free radicals and excited molecules. As a result of this UV/ozone surface treatment the surface energy of the oil contaminated substrate is increased to values very close to the initial surface energy of a non-printed paper. Exposing the non-image area to both UV radiation and ozone leads to changes in the substrate surface chemistry as illustrated by the presence of polar carbonyl groups. As a result the surface becomes highly polar after this treatment. Exposure to UV radiation as specified in this embodiment being of sufficient intensity, power and time to result in excellent adhesion for a range of typical end-use applications. In this embodiment the requirement to supply two classes of wavelength is essential to controlling the method to time, power and intensity levels of UV radiation to operate within acceptable practical limits for this kind of application.

In specific embodiments, the method comprises providing a source of ultraviolet radiation where the UV radiation comprises at least a first wavelength and a second wavelength, applying the ultraviolet radiation to a xerographic printed paper contaminated with fuser oil as a result of the fusing process, and treating the xerographic printed paper with the ultraviolet radiation and ozone, wherein the surface energy of the contaminated print is substantially increased and the treated xerographic print subsequently exhibits excellent adhesion as a result of the UV/ozone surface treatment.

The ultraviolet radiation source may comprise at least a first wavelength $\lambda_1$ of from about 210 nm to about 315 nm and a second wavelength $\lambda_2$ of from about 100 nm to about 210 nm. In further embodiments, the ultraviolet radiation source may comprise at least a first wavelength $\lambda_1$ of about 254 nm and a second wavelength $\lambda_2$ of about 185 nm. The ultraviolet radiation may be applied to the xerographic print at any point after fusing is completed. In embodiments, the ultraviolet radiation is applied by a UV output lamp. The ultraviolet radiation is applied to optimize treatment of the contaminated print by modifying the required distance between the UV output lamp and the xerographic printed paper, lamp intensity and exposure time.

In the presents embodiments, the surface energy of the print is determined from contact angle values of a first standard testing liquid and a second standard testing liquid with known surface tensions, wherein the first standard testing liquid is polar and the second testing liquid is dispersive. However, the surface energy can also be calculated by other means. In one embodiment, the first standard testing liquid is water and the second standard testing liquid is diiodomethane. As measured, the surface energy of the contaminated print is significantly increased from about 11 mN/m to about 45 mN/m, or from about 13 mN/m to about 40 mN/m, as calculated from the contact angle values of water and diiodomethane as a consequence of the UV/ozone surface treatment. Additionally, the polar surface energy component of the surface treated contaminated print is significantly increased from about 0.1 mN/m to about 20 mN/m as calculated from the contact angle values of water and diiodomethane. The polar surface energy component as calculated from the contact angle values of water and diiodomethane is associated with the appearance of carbonyl groups on the surface of the surface treated contaminated print as measured by ATR/FTIR. As a result, the treated xerographic print exhibits excellent adhesion by an increase in the adhesive bond paper fiber tear measured on a non-imaged area from about 0% up to about 100% as a result of the UV/ozone surface treatment.

Another embodiment is a xerographic print comprising a substrate, which may be coated or uncoated paper for example, with a toner-based image printed thereon, including low surface tension regions resulting from the application of fuser oil which has been exposed to UV radiation under conditions such that the surface energy of the non-image areas of the print has been restored to values approximately equal to those prior to fusing and contact with fuser oil. The print specified in this embodiment will exhibit excellent wetting and adhesion in a range of typical end-use applications.

For example, in one embodiment, there is provided a xerographic print comprising a paper substrate, and a fused toner image on the paper substrate containing residual fuser oil contamination, wherein the xerographic print has been surface treated with ultraviolet radiation comprising at least a first wavelength and a second wavelength and further wherein the surface energy of the oil contaminated non-image area of the xerographic print after printing measures approximately the same value as the surface energy on the paper substrate prior to printing of the toner image such that the xerographic print displays excellent adhesion. The xerographic print may contain residual fuser oil being functionalized or non-functionalized oil ranging from about 2 mg/copy to about 20 mg/copy. In such embodiments, the surface energy of the oil contaminated non-image area of the xerographic print is significantly increased from about 11 mN/m to about 45 mN/m as a consequence of the UV/ozone surface treatment. In addition, such xerographic prints exhibit excellent adhesion by an increase in the adhesive bond paper fiber tear measured on a non-image area from about 0% up to about 100% as a result of the UV/ozone surface treatment.

As shown in FIG. 1, specific embodiments provide for a method for increasing the surface energy of an oil contaminated print by using a UV lamp, for example, a low pressure mercury Pen Ray Lamp (available from Cole-Parmer, Vernon Hills, Ill.). The UV lamp 5 is placed a distance d away from the surface of the contaminated paper 10. The distance d between the UV lamp 5 and the paper 10 affects the UV treatment efficiency, as the lamp intensity decreases with increasing this distance. A distance of a few millimeters between the lamp and the substrate has shown to provide effective treatment as well as avoid excessive absorption of the UV radiation in air. In embodiments, the distance d is no more than about 5 millimeters. In other embodiments, the distance d is from about 0 millimeters to about 20 millimeters. However, the distance can also be outside of these ranges. In addition, treatment efficiency can be affected by the UV output of the lamp used for this treatment. For example, by using higher output lamps, the treatment time can be reduced to seconds as well as anywhere between 0 and 1 second. When a higher UV output lamp is used, for example an amalgam lamp with a UV output power of 150 W (3 W/cm), available from Heraeus Noblelight (Hanau, Germany), the efficiency of the surface treatment applied to the print is significantly increased, by reducing the exposure time from 25 minutes to 100 seconds which is enough time to increase the surface energy of the oil contaminated print to levels that are within the normal range for end-use applications.

The present embodiments provide a method for increasing the surface energy of an oil contaminated print in accordance with the present embodiments. An UV lamp is used to output UV radiation mainly on two groups of wavelengths, $\lambda_1$ and $\lambda_2$. In one embodiment, $\lambda_1$ is a wavelength preferably 254 nm, but within the range 210-315 nm and $\lambda_2$ is a wavelength preferably 185 nm but within the range 100-210 nm. However, the wavelengths can also be outside of these ranges. The UV/ozone surface cleaning concept that is used towards removing the organic contamination was recognized by R. R. Sowell, R. E. Cuthrell in the Journal of Vacuum Science and Technology (Vol. 11, pages 474-475, January/February 1974), and the actual organic removal mechanism is described by J. R. Vig in the Handbook of Semiconductor Wafer Cleaning Technology ("Ultraviolet-Ozone Cleaning of Semiconductor Surfaces," page 233). It is surmised from Vig that the same cleaning effect may be achieved when the UV radiation and ozone are used separately but it would require much longer exposure time.

In the present embodiments, the UV/ozone treated surface has a surface energy that is about four times higher than the surface energy of the oil contaminated print. As a result of the paper treatment, the present embodiments provide a method by which to treat oil contaminated paper such that the paper subsequently exhibits excellent adhesion and related properties associated with a variety of finishing operations. For example, in embodiments, the treated paper exhibits an increase in paper fiber tear from about 0% up to about 100%, or from about 85% up to about 100%.

Various exemplary embodiments encompassed herein include a method of imaging which includes generating an electrostatic latent image on a xerographic surface by uniformly charging a photoreceptor; a thermoplastic toner is then transferred to the charged area by electrostatic attraction and the developed image is fixed in a fusing process involving the application of heat and pressure.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

The UV/ozone decontamination experiments were carried out using 10 pt. CAROLINA® paper (available from International Paper Co., Memphis, Tenn.) and PRODUCTOLITH® paper (available from NewPage Corp., Miamisburg, Ohio) which were contaminated with WACKER® 0.24% amino oil (available from Wacker Chemie AG, Munich, Germany) by passing blank sheets of paper through a XEROX® printer. The UV/ozone treatment was performed by using a 54 mW/cm$^2$ quartz tube mercury Pen Ray Lamp placed a distance of 5 millimeters away from the surface of the contaminated paper. An irradiation time was set at 5 minutes, 15 minutes and for PRODUCTOLITH® paper and set at 5 minutes, 10 minutes, 15 minutes, 20 minutes and 25 minutes for CAROLINA® paper. It is noted that the present embodiments may also be used with various other types of printers and paper substrates not disclosed herein.

The low pressure mercury Pen Ray Lamp emits two main wavelengths, $\lambda_1$=254 nm and $\lambda_2$=185 nm. The $\lambda_2$=185 nm radiation is absorbed by the atmospheric oxygen, which dissociates into atomic oxygen and subsequently recombined to partly form ozone. In the present disclosure, the surface of the contaminated print was subjected to the combined action of UV radiation and ozone.

The contact angles of three standard testing liquids with known surface tensions, were measured on the surface of each paper type for the original uncontaminated print, the oil contaminated print and after the UV/ozone treatment of the contaminated print respectively. All the measurements performed after the UV/ozone cleaning were conducted immediately after the surface treatment was ceased. Tables 1 and 2 contain the resulting contact angle data for each of the three liquids (water, formamide and diiodomethane) as tested on PRODUCTOLITH® paper and CAROLINA® paper. The contact angle data was reported after 1 second ("1 s") from the moment the drop touched the respective surfaces. This measurement provided a good equilibrium condition as the drop had sufficient time to "settle" and no spreading on the surface was observed after 1 second. The contact angle results of all three liquids show significant improvement in surface wettability after applying the surface treatment to the print as exhibited by a decrease in the contact angle with exposure time. However these measurements are not limited to the use of this particular set of liquids, as there is a variety of standard liquids with known properties that are suitable for this type of wettability studies.

TABLE 1

| Paper Conditions | Water (1 s) | Formamide (1 s) | Diiodomethane (1 s) |
|---|---|---|---|
| 10 pt PRODUCTOLITH ® Original | 60.6 | 51.3 | 39.7 |
| 10 pt PRODUCTOLITH ® with WACKER ® 0.24 before UV/ozone | 117.4 | 107.5 | 87.8 |
| 10 pt PRODUCTOLITH ® with WACKER ® 0.24 after UV/ozone (5 minutes) | 82.1 | 100.8 | 74.8 |
| 10 pt PRODUCTOLITH ® with WACKER ® 0.24 after UV/ozone (15 minutes) | 70.3 | 79.4 | 68.9 |
| 10 pt PRODUCTOLITH ® with WACKER ® 0.24 after UV/ozone (25 minutes) | 60.0 | 61.9 | 50.6 |

The last measurement* of Table 2 was conducted to test the stability of this surface treatment, namely, to see if the contact angle data would change significantly after the paper is measured one day after the UV/ozone treatment and the data confirms that there is no significant change and that this treatment is indeed stable for at least 24 hours.

TABLE 2

| Paper Conditions | Water (1 s) | Formamide (1 s) | Diiodomethane (1 s) |
|---|---|---|---|
| 10 pt CAROLINA ® Original | 81.4 | 60.4 | 35.1 |
| 10 pt CAROLINA ® with WACKER ® 0.24 before UV/ozone | 118.2 | 106.8 | 92.0 |
| 10 pt CAROLINA ® with WACKER ® 0.24 after UV/ozone (5 minutes) | 115.2 | 108.8 | 79.2 |
| 10 pt CAROLINA ® with WACKER ® 0.24 after UV/ozone (10 minutes) | 101.4 | 92.0 | 75.0 |
| 10 pt CAROLINA ® with WACKER ® 0.24 after UV/ozone (15 minutes) | 83.1 | 70.5 | 65.5 |
| 10 pt CAROLINA ® with WACKER ® 0.24 after UV/ozone (20 minutes) | 60.5 | 62.7 | 70.2 |
| 10 pt CAROLINA ® with WACKER ® 0.24 after UV/ozone (25 minutes) | 62.3 | 74.3 | 62.3 |

TABLE 2-continued

| Paper Conditions | Water (1 s) | Formamide (1 s) | Diiodomethane (1 s) |
|---|---|---|---|
| 10 pt CAROLINA ® with WACKER ® 0.24 after UV/ozone (20 minutes)* | 63.4 | 64.2 | 69.3 |

The effects of the UV/ozone treatment on the surface energy (including polar and dispersive surface energy components) of the contaminated paper are summarized in Tables 3 (based on testing with PRODUCTOLITH® paper) and 4 (based on testing with CAROLINA® paper). The surface energy is calculated using Wu's geometric model based on the contact angle values of two of the three standard liquids above, such as water (polar), and diiodomethane (dispersive) which are measured on the paper surface for each condition. As it can be seen from Tables 3 and 4, the surface energy of the oil contaminated paper undergoes a significant decrease as compared to the values of the uncontaminated paper. However, after the UV/ozone treatment, the surface energy of paper increases dramatically to values very close to the corresponding values of the original uncontaminated paper. Furthermore, the surface energy generally increases as the application of the UV/ozone treatment (time-wise) increases. The last measurement* of Table 4 was conducted to test stability, namely, to see if the surface energy maintains a high value when the paper is measured one day after the UV/ozone treatment and the data confirms that this surface treatment is indeed stable for at least 24 hours. However, there are other surface energy models that can be used which may require one, two or all three standard testing liquids. These surface energy calculations are not limited to the use of this particular set of liquids, as there is a variety of standard liquids with known properties that may be suitable for this study.

TABLE 3

| | Surface Energy (mN/m) | | |
|---|---|---|---|
| Paper Type | LW (dispersive) | Polar | Total |
| 10 pt PRODUCTOLITH ® Original | 33.26 | 14.66 | 47.92 |
| 10 pt PRODUCTOLITH ® with WACKER ® 0.24 before UV/ozone | 13.65 | 0.11 | 13.76 |
| 10 pt PRODUCTOLITH ® with WACKER ® 0.24 after UV/ozone (5 minutes) | 16.37 | 9.94 | 26.31 |
| 10 pt PRODUCTOLITH ® with WACKER ® 0.24 after UV/ozone (15 minutes) | 18.12 | 16.26 | 34.38 |
| 10 pt PRODUCTOLITH ® with WACKER ® 0.24 after UV/ozone (25 minutes) | 27.35 | 17.22 | 44.56 |

TABLE 4

| | Surface Energy (mN/m) | | |
|---|---|---|---|
| Paper Type | LW (dispersive) | Polar | Total |
| 10 pt CAROLINA ® Original | 39.43 | 3.07 | 42.51 |
| 10 pt CAROLINA ® with WACKER ® 0.24 before UV/ozone | 11.63 | 0.21 | 11.84 |
| 10 pt CAROLINA ® with WACKER ® 0.24 after UV/ozone (5 minutes) | 18.18 | 1.56 | 20.42 |
| 10 pt CAROLINA ® with WACKER ® 0.24 after UV/ozone (10 minutes) | 18.85 | 1.56 | 20.42 |
| 10 pt CAROLINA ® with WACKER ® 0.24 after UV/ozone (15 minutes) | 21.88 | 7.03 | 28.91 |
| 10 Pt CAROLINA ® with WACKER ® 0.24 after UV/ozone (20 minutes) | 16.22 | 24.74 | 40.96 |
| 10 pt CAROLINA ® with WACKER ® 0.24 after UV/ozone (25 minutes) | 20.81 | 20.11 | 40.91 |
| 10 pt CAROLINA ® with WACKER ® 0.24 after UV/ozone (20 minutes)* | 17.04 | 21.91 | 38.95 |

Example 2

Figure 2A:
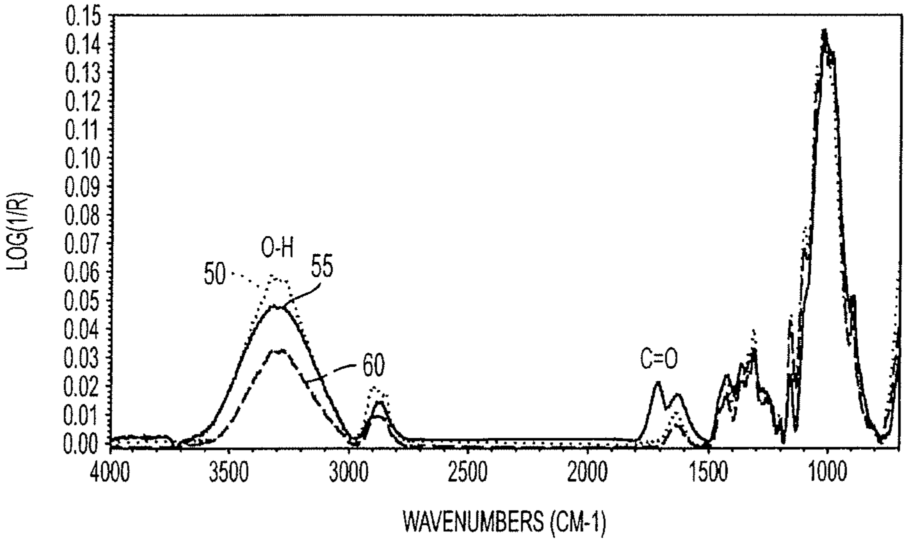
FIG. 2A shows Attenuated Total Reflection Fourier Transform Infrared Spectroscopy (ATR/FTIR) graphical results of the UV/ozone treatment on CAROLINA® paper in accordance with the present embodiments.
Figure 2B:
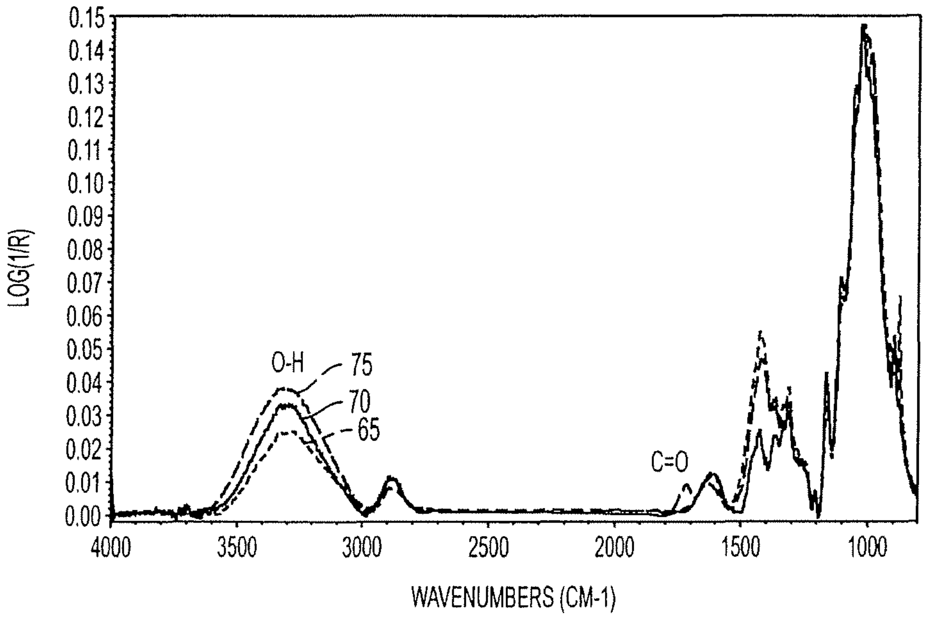
FIG. 2B shows ATR/FTIR graphical results of the UV/ozone treatment on PRODUCTOLITH® paper in accordance with the present embodiments.

Another interesting observation is that the UV/ozone treated surface becomes highly polar which indicates more enhanced adhesion properties than the original paper. FIGS. 2A-2B shows results of an ATR/FTIR investigation of this effect when the oil contaminated paper is irradiated by UV/ozone. The spectrum shows the formation of polar carbonyl groups around 1710 $cm^{-1}$ after the oil contaminated paper is exposed to both UV radiation and ozone. Both types of paper show this change in the surface chemistry due to the formation of new compounds.

FIG. 2A demonstrates the results when used in connection with CAROLINA® paper. The dotted line 50 indicates results using 10 pt CAROLINA® paper with no oil and no UV/ozone treatment. The solid line 55 indicates results using 10 pt CAROLINA® paper with WACKER® 0.24% oil and UV/ozone treatment for 25 minutes. The dashed line 60 indicates results using 10 pt CAROLINA® paper with WACKER® 0.24% oil and no UV/ozone treatment. FIG. 2B demonstrates the results when used in connection with PRODUCTOLITH® paper. The smaller dashed line 65 indicates results using 10 pt PRODUCTOLITH® paper with no oil and no UV/ozone treatment. The solid line 70 indicates results using 10 pt PRODUCTOLITH® paper with WACKER® 0.24% oil and no UV/ozone treatment. The larger dashed line 75 indicates results using 10 pt PRODUCTOLITH® paper with WACKER® 0.24% oil and UV/ozone treatment for 25 minutes. It is clear from FIGS. 2A-2B that the UV/ozone treatment applied to the oil contaminated paper modifies the chemical properties of the surface, leading to the creation of new compounds on the surface of the paper.

Figure 3:
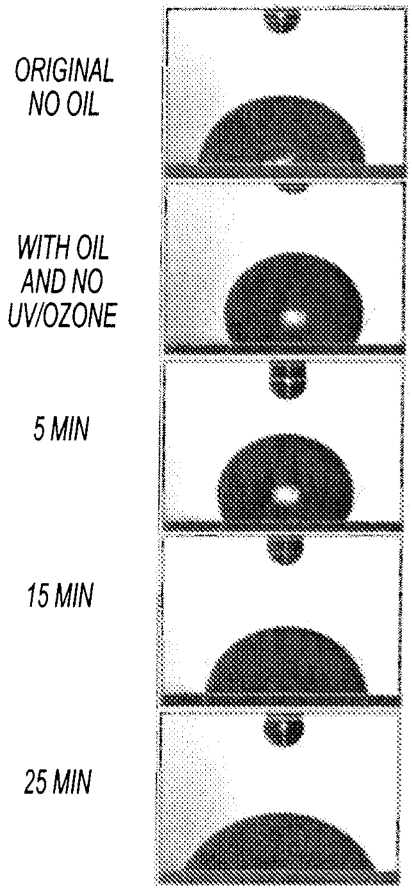
FIG. 3 shows images of water drops deposited on paper to demonstrate the effects of the present embodiments.

FIG. 3 demonstrates the water contact angle before and after the UV/ozone treatment of 10 pt CAROLINA® paper.

As it can be seen, the images show how the surface of the paper becomes more wettable with increasing treatment time. A similar trend in surface wettability enhancement with increasing treatment time is observed for 10 pt PRODUCTOLITH® paper as well.

Example 3

As improved paper surface properties had been observed after treating oil contaminated 10 pt CAROLINA® paper and PRODUCTOLITH® paper with the UV/ozone method, a gluability test was also conducted.

The oil contaminated sheets used for this test were generated by running the papers through a XEROX® printer running with WACKER® 0.24% amino functionalized fuser oil. The amount of oil on each letter size sheet is around 9-11 mg/copy as measured by ICP (Inductively Coupled Plasma) and only the uncoated side of the paper was contaminated in this process. No fiber tear can be observed on the WACKER® 0.24% oil contaminated uncoated side of this paper by using commercial available hot melt adhesives.

About 4-5 grams of US661 adhesive (available from United States Adhesives, Chicago, Ill.) were heated at 175° C. having a viscosity around 4000 Cp. This adhesive was manually applied on the oil contaminated non-treated and UV/ozone-treated paper using a Meyer Rod coating machine, specifically Meyer Rod #3.

A corresponding piece of the same page is placed on top of the liquid adhesive within a few seconds and a sandwich formation is made. The sandwich is placed in a sealer immediately under compression pressure at 5 psi for a period of 3 seconds and then further removed and cooled. The portion compressed by the sealer was cut to approximately 1.5×5 inches. The samples were left setting at ambient temperature for approximately 24 hours before they were peeled. Paper fiber tear is measured by manually separating the pieces of the sandwich and visually inspecting the results: 0% means that there is no paper fiber tear (undesirable result). For example, no fiber tear would mean that the two pieces of paper can easily be separated without any tearing due to lack of adhesion. 100% means complete adhesion and thus tearing of the two pieces of paper when they were manually separated (desirable result).

The gluability results on WACKER® 0.24% oil contaminated 10 pt CAROLINA® paper and PRODUCTOLITH® paper, both with and without UV/ozone treatment, are shown in Tables 5 and 6. Greatly improved fiber tear due to the UV/ozone treatment of oil contaminated paper is demonstrated. Tables 7 and 8 illustrate the stability of this treatment when both oil contaminated papers are exposed to the UV radiation for 25 minutes and they are left sitting around for 14 days at the end of which the gluability test is conducted. The experimental results show that this treatment is indeed stable for at least 14 days, showing very good fiber tear for both papers.

Table 9 shows fiber tear results on 10 pt Productolith paper, uncoated side, contaminated with Wacker 0.24% fuser oil after the paper had been exposed to an amalgam UV/ozone lamp with a higher UV output of about 150 Watts (3 W/cm), available from Heraeus Noblelight. The data clearly shows that shorter exposure time is needed to achieve good fiber tear, in this case at least 100 seconds, when a higher UV output lamp is used for this type of surface treatment.

TABLE 5

| 10 pt CAROLINA ® with WACKER ® 0.24 by XEROX ® printer | | | | |
|---|---|---|---|---|
| Paper Irradiation Time (min) | Fiber Tear Test 1 | Fiber Tear Test 2 | Fiber Tear Test 3 | Fiber Tear Average (%) |
| 0 | 0 | 0 | 0 | 0 |
| 5 | 0 | 0 | 0 | 0 |
| 15 | 40 | 15 | 35 | 30 |
| 25 | 80 | 85 | 90 | 85 |

TABLE 6

| 10 pt PRODUCTOLITH ® with WACKER ® 0.24 by XEROX ® printer | | | | |
|---|---|---|---|---|
| Paper Irradiation Time (min) | Fiber Tear Test 1 | Fiber Tear Test 2 | Fiber Tear Test 3 | Fiber Tear Average (%) |
| 0 | 0 | 0 | 0 | 0 |
| 5 | 0 | 0 | 0 | 0 |
| 15 | 40 | 45 | 65 | 50 |
| 25 | 90 | 95 | 80 | 88 |

TABLE 7

| 10 pt CAROLINA ® with WACKER ® 0.24 by XEROX ® printer | | | |
|---|---|---|---|
| Paper Irradiation Time (min) | Fiber Tear Test 1 | Fiber Tear Test 2 | Fiber Tear Average (%) |
| 25 | 100 | 100 | 100 |

TABLE 8

| 10 pt PRODUCTOLITH ® with WACKER ® 0.24 by XEROX ® printer | | | |
|---|---|---|---|
| Paper Irradiation Time (min) | Fiber Tear Test 1 | Fiber Tear Test 2 | Fiber Tear Average (%) |
| 25 | 90 | 85 | 87 |

TABLE 9

| 10 pt PRODUCTOLITH ® with WACKER ® 0.24 by XEROX ® printer | | | |
|---|---|---|---|
| Paper Irradiation Time (sec) | Fiber Tear Test 1 | Fiber Tear Test 2 | Fiber Tear Average (%) |
| 100 | 100 | 100 | 100 |
| 120 | 100 | 100 | 100 |

The above results of the reduction to practice of the present embodiments demonstrate the discovery that a combination of UV radiation and ozone applied in the inventive manner described herein provides an effective method which increases the surface energy of an oil contaminated print that exhibits significantly improved adhesion properties as a direct result of this treatment.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A surface treated xerographic print consisting of:

a paper substrate; and a fused toner image on the paper substrate containing residual fuser oil contamination, wherein the xerographic print has been surface treated with ultraviolet radiation comprising at least a first wavelength and a second wavelength such that the surface energy of the oil contaminated non-image area of the xerographic print after printing measures approximately the same value as the surface energy on the paper substrate prior to printing of the toner image and the xerographic print displays excellent adhesion.

2. The surface treated xerographic print of claim 1 further containing residual fuser oil being functionalized or non-functionalized oil ranging from about 2 mg/copy to about 20 mg/copy.

3. The surface treated xerographic print of claim 1, wherein the ultraviolet radiation source comprises at least a first wavelength $\lambda_1$ of from about 210 nm to about 315 nm and a second wavelength $\lambda_2$ of from about 100 nm to about 210 nm.

4. The surface treated xerographic print of claim 1, wherein the ultraviolet radiation source comprises at least a first wavelength $\lambda_1$ of about 254 nm and a second wavelength $\lambda_2$ of about 185 nm.

5. The surface treated xerographic print of claim 1, wherein the ultraviolet radiation is applied to the xerographic print at any point after fusing is completed.

6. The xerographic print of claim 1, wherein the paper substrate exhibits an increase of polar carbonyl groups on a surface of the paper substrate as compared to the paper substrate prior to the UV/ozone surface treatment.

7. The xerographic print of claim 1 exhibiting an increase in paper fiber tear from about 85% up to about 100%.

8. The surface treated xerographic print of claim 1, wherein the surface energy of the oil contaminated non-image area of the xerographic print is significantly increased from about 11 mN/m to about 45 mN/m as a consequence of the UV/ozone surface treatment.

9. The surface treated xerographic print of claim 8 further exhibiting excellent adhesion by an increase in the adhesive bond paper fiber tear measured on a non-image area from about 0% up to about 100% as a result of the UV/ozone surface treatment.

* * * * *